United States Patent [19]
Murai et al.

[11] Patent Number: 6,002,489
[45] Date of Patent: Dec. 14, 1999

[54] PRODUCT CATALOG HAVING IMAGE EVALUATION CHART

[75] Inventors: Yukako Murai; Norio Kanemitsu, both of Kawasaki, Japan

[73] Assignee: Fujitsu Limited, Kawasaki, Japan

[21] Appl. No.: 08/721,971

[22] Filed: Sep. 27, 1996

Related U.S. Application Data

[63] Continuation of application No. 08/521,955, Aug. 31, 1995, abandoned, which is a continuation of application No. 08/213,504, Mar. 16, 1994, abandoned.

[30] Foreign Application Priority Data

Apr. 2, 1993 [JP] Japan .................................... 5-076933

[51] Int. Cl.⁶ .............................. H04N 1/00; G03G 15/00
[52] U.S. Cl. .............................. 358/406; 358/400; 399/8; 399/9
[58] Field of Search ..................... 358/406, 462, 358/465, 466, 467, 400, 500, 504, 401, 455, 501, 518, 522, 461, 296; 356/243; 379/100; 364/525; 395/106; 399/8, 9

[56] References Cited

U.S. PATENT DOCUMENTS

| | | | |
|---|---|---|---|
| 5,194,966 | 3/1993 | Quardt et al. | 358/406 |
| 5,309,256 | 5/1994 | Takada et al. | 358/504 |
| 5,396,342 | 3/1995 | Meyer | 358/406 |

OTHER PUBLICATIONS

Hewlett Packard Laser Jet IIID Printer User's Manual ©Hewlett Packard Company 1990 pp. 4–11 to 4–15.

CCITT Blue Book, vol. VII, Fascicle VII. 3, pp. 67–76, 1989.

*Primary Examiner*—Kimberly A. Williams
*Attorney, Agent, or Firm*—Staas & Halsey LLP

[57] ABSTRACT

A product catalog related to an image reading apparatus includes a recording medium having a first side and a second side, at least one description region provided on an arbitrary one of the first and second sides of the recording medium and including characters and/or graphics describing the image reading apparatus, and at least one image evaluation pattern provided on an arbitrary one of the first and second sides of the recording medium and including a pattern for evaluating a performance of the image reading apparatus which processes the pattern.

68 Claims, 5 Drawing Sheets

PRODUCT CATALOG HAVING IMAGE EVALUATION CHART

This application is a continuation of application Ser. No. 08/521,955, filed Aug. 31, 1995, now abandoned, which is a continuation of application Ser. No. 08/213,504, filed Mar. 16, 1994, now abandoned.

BACKGROUND OF THE INVENTION

1. Field of Invention

The present invention generally relates to product catalogs, and more particularly to a product catalog which has the function of a test chart which is used to evaluate the performance of image processing apparatuses such as facsimile machines, optical character readers (OCRs), image scanners and optical filing systems.

2. Description of Related Art

Recently, the use of various kinds of image processing apparatuses has become popular. Not only the skilled operators, but also the general user who is a non-expert are now using such image processing apparatuses. For example, the use cf optical filing systems and OCRs is successively becoming more popular, and image scanners provided in facsimile machines and personal computers are not only used in offices but also often used in homes.

When adjusting the image processing apparatus, when the image processing apparatus is set up, and when checking the operating state of the image processing apparatus during use, a test chart is used to evaluate the performance of the image processing apparatus. For example, the test chart can be used to evaluate the image quality obtainable by the image processing apparatus. The test chart itself and the use thereof are known. As examples of the known test charts, there are the color test charts and the facsimile test charts established by The Institute of Image Electronics Engineers of Japan.

The test chart is primarily used to confirm the required image reproducibility when producing the image processing apparatus, operating tile image processing apparatus, and attending to the maintenance of the image processing apparatus. In addition, since many image processing apparatuses process color images, the test chart must be made by taking into account the color or hue.

Conventionally, various standards such as the conditions related to the thickness of the printing paper used, the smoothness of the printing paper used and the like were prescribed for the test charts. In addition, because the test charts are made with a high precision to guarantee a common evaluation reference, the tests charts were relatively expensive and had to be handled with care. If the test charts were stained or undergo discoloring, color fading or the like due to poor handling, it became difficult if not impossible to make an accurate image evaluation.

Accordingly, the kind of printing paper used, the printing density, the hue, the size of characters and lines, the arrangement of the characters and lines or the like are accurately determined with respect to the test chart. For example, the printing paper used for the test chart has superior characteristics for all of the basic weight ($g/m^2$), the thickness, the smoothness, the gloss, the anti-elasticity and the like. The production cost of such a test chart which satisfies all of the requirements is thus high, and the test chart must be handled with care. For this reason, it is not very desirable that the test chart is carried by a person for business purposes.

The test chart which satisfies the above described standards is essential when testing the image processing apparatus upon completion, and testing the image processing apparatus after completion such as repairing the image processing apparatus and replacing the parts of the image processing apparatus.

However, after the thorough adjustments are completed, when the image processing apparatus is delivered, and after the final tests are completed after a large repair is made at the factory, it is unlikely that the completed state of the image processing apparatus will greatly deviate from the adjusted values by the time the image processing apparatus is set up. In other words, a big problem is very unlikely to occur from the time when the image processing apparatus is adjusted at the factory to the time when the image apparatus is set up.

Therefore, when setting up the image processing apparatus and during use of the image processing apparatus, it may not be essential to use the highly accurate test chart for the purpose of testing and adjustment.

On the other hand, a product catalog describes the features or characteristics, the (how to use) directions and the like of the product. From the point of view of business, the product catalog is essential to inform the user of the features or characteristics of the product. The product catalog is generally completed before sales of the new product, and reserves of the product catalog are usually kept thereafter.

Hence, the test chart used for the image evaluation, and the product catalog, were conventionally understood to be and treated as completely unrelated and independent materials. In other words, the test chart was used exclusively at the factory and by the service people who make the adjustments at the time the image processing apparatus is set up, repair the image processing apparatus, and make the periodic check (maintenance) of the image processing apparatus. On the other hand, the product catalog was used exclusively for business and distributed to the user. However, this was not always convenient for the service people and the user.

It is possible to print on the product catalog a comparison of the new image processing apparatus and the old image processing apparatus. For example, such a comparison may included photographs of the images obtained by the new and old image processing apparatuses. However, the photographs of the images obtained by the new and old image processing apparatuses are of course not identical to the actual images obtained, and the user may not always be persuaded by such photographs.

Hence, when demonstrating the performance of the image processing apparatus to the user, it is conceivable to use the test chart to enable the user to actually compare the differences in the performance of the new image processing apparatus and the old image processing apparatus, for example. However, because the test chart is originally made to provide a general-purpose reference for judging the performance of the image processing apparatus, a certain test chart used for the demonstration may be unsuited for emphasizing the advantageous features or characteristics of the new image processing apparatus.

On the other hand, the user may wish to take home various test charts and compare the images obtained during the demonstration with the images obtained by his image processing apparatus when the test charts are used at his home. However, as described above, the test charts are relatively expensive and it is undesirable to distribute the test charts to the user when the cost is considered. Furthermore, even if it were possible to reduce the cost of the test charts, the manufacturer would have to distribute both the product catalog, and the test charts, and it would be inconvenient for both the manufacturer and the user to keep and carry the product catalog and the various kinds of test charts for the same product.

SUMMARY OF THE INVENTION

Accordingly, it is a general object of the present invention to provide a novel and useful product catalog in which the problems described above are eliminated.

Another and more specific object of the present invention is to provide a product catalog related to an image processing apparatus and comprising a recording medium having a first side and a second side, at least one description region, provided on an arbitrary one of the first and second sides of the recording medium, containing characters and/or graphics describing the image processing apparatus, and at least one image evaluation patterns, provided on an arbitrary one of the first and second sides of the recording medium, containing a pattern for evaluating a performance of an image processing apparatus which processes the pattern. According to the product catalog of the present invention, it is possible to check and test the image processing apparatus using the image evaluation pattern of the product catalog, thereby making it unnecessary for the service people to carry expensive test charts which need to be handled with care. In addition, the user may use the image evaluation pattern of the product catalog to compare images obtainable by two different image processing apparatuses, for example. Furthermore, the precision with which the image evaluation pattern is printed on the product catalog may not necessarily be as high as the precision required to print the conventional test charts.

Still another object of the present invention is to provide a product catalog related to an image processing apparatus and comprising a sheet-shaped medium having a first side and a second side, and a plurality of description regions, provided on at least an arbitrary one of the first and second sides of the sheet-shaped medium, where the description regions contain characters and/or graphics describing the image processing apparatus, an image evaluation pattern is formed by at least a portion of at least one of the description regions, and the image evaluation pattern contains a pattern for evaluating a performance of an image processing apparatus which processes the pattern. According to the product catalog of the present invention, it is possible to check and test the image processing apparatus using the image evaluation pattern of the product catalog, thereby making it unnecessary for the service people to carry expensive test charts which need to be handled with care. In addition, the user may use the image evaluation pattern of the product catalog to compare images obtainable by two different image processing apparatuses, for example. Furthermore, the precision with which the image evaluation pattern is printed on the product catalog may not necessarily be as high as the precision required to print the conventional test charts. Moreover, the space utilization efficiency of the product catalog is high because at least a portion of the description region is used in common as the image evaluation pattern.

Other objects and further features of the present invention will be apparent from the following detailed description when read in conjunction with the accompanying drawings.

DESCRIPTION OF THE PREFERRED EMBODIMENTS

Figure 1:
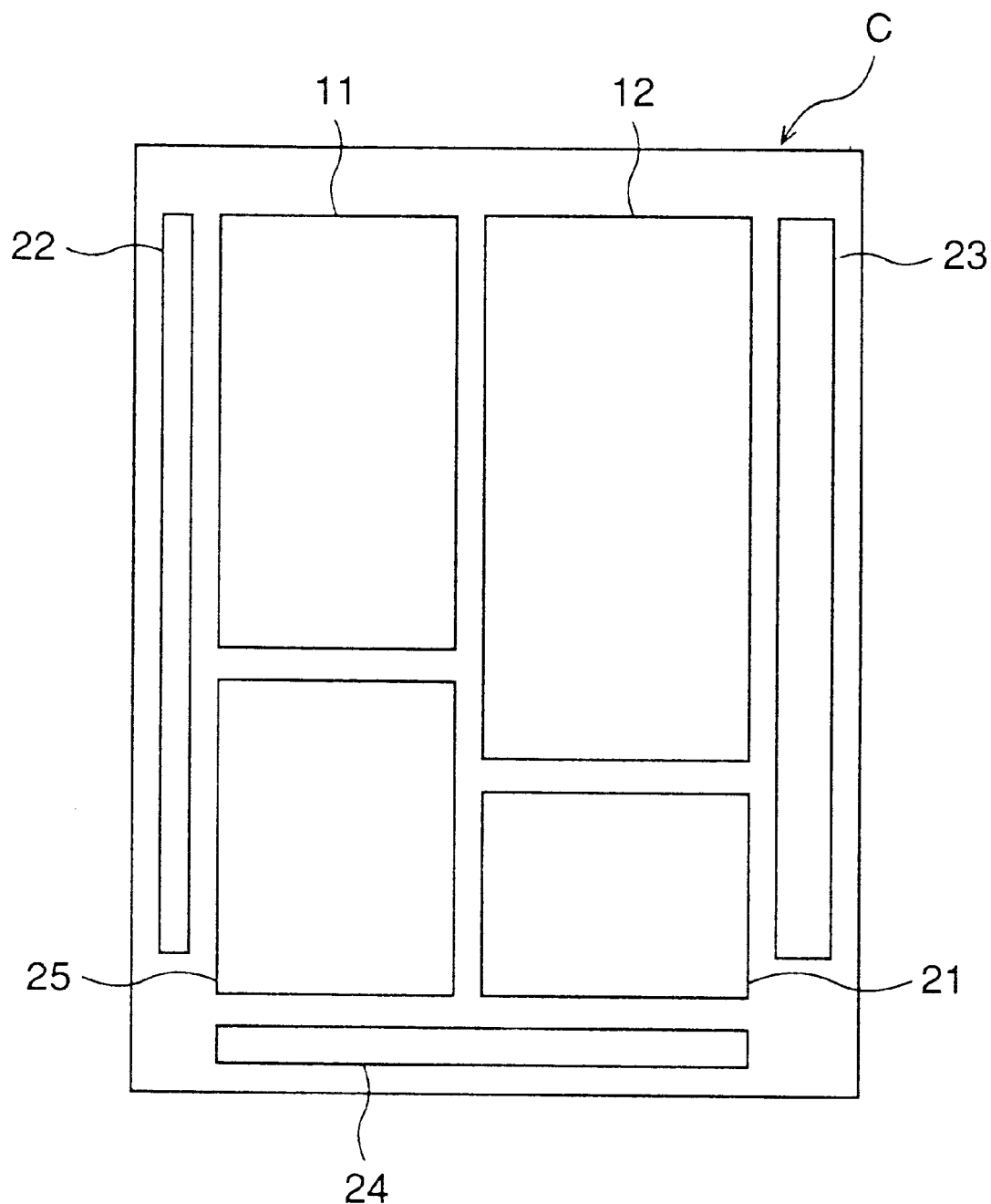
FIG. 1 is a plan view showing a first embodiment of a product catalog according to the present invention.

FIG. 1 shows a first embodiment of a product catalog according to the present invention.

A product catalog C shown in FIG. 1 includes a descriptive portion 11, a graphic portion 12, a resolution pattern 21, a gradation scale 22, a black-and-white pattern 23, a tapered line pattern 24, and a character pattern 25 which are arranged as shown.

The descriptive portion 11 and the graphic portion 12 are provided as description regions for describing the features, characteristics, (how to use) directions, and the like, of at least one product, similarly to the conventional catalog. The descriptive portion 11 includes descriptions related to the product. The graphic portion 12 includes one or more photographs, figures and the like related to the product.

On the other hand, the resolution pattern 21, the gradation scale 22, the black-and-white pattern 23, the tapered line pattern 24 and the character pattern 25 are provided as image evaluation patterns for use in evaluating the performance of the product. For the sake of convenience, it will be assumed that the product is a copying machine and the image evaluation patterns are used to evaluate the performance or the image quality obtained by the copying machine. The image which is obtained by the copying machine in this case is either the image which is received from a remote copying machine and printed by the copying machine or the image which is read and transmitted from the copying machine.

For example, the resolution pattern 21 is used to evaluate the resolution of the image obtained by the copying machine. The gradation scale 22 is used to evaluate the gradation levels of the image obtained by the copying machine. The black-and-white pattern 23 is used to evaluate the contrast or sharpness of the image obtained by the copying machine. The tapered line pattern 24 is used to evaluate the quality of an oblique line in the image which is obtained by the copying machine. In addition, the character pattern 25 is used to evaluate the quality of the characters in the image which is obtained by the copying machine, that is, the quality of the characters having different sizes.

The locations of the various image evaluation patterns in the catalog C are of course not limited to those shown in FIG. 1, and each image evaluation pattern may be provided at an arbitrary position. In addition, it is possible to provide the image evaluation pattern on only the front or back side of the catalog or, provide the image evaluation patterns on both sides of the catalog. In other words, one or more kinds of image evaluation patterns may be provided on the front and/or back side of the catalog C. It is also possible to provide the image evaluation patterns at unused portions of an existing product catalog.

In addition, the kinds of image evaluation patterns in the catalog C are also not limited to those shown in FIG. 1. It is possible to provide other kinds of image evaluation patterns such as a color sensation pattern for evaluating the color sensation of the obtained image, and graphics such as a photograph and a figure for evaluating the contrast, gradation level, resolution and color of the obtained image. For example, when using the photographs as the image evaluation patterns, it is possible to use the photographs for evaluating the resolution if photographs of different resolutions are printed on the product catalog C.

The various image evaluation patterns may be in conformance with a predetermined standard such as a test chart prescribed by The Institute of Image Electronics Engineers of Japan. Alternatively, the various image evaluation patterns may be designed and selected to suit the particular product. The latter is preferable from the point of view of emphasizing the advantageous features and characteristics of the particular product. For example, if the resolution of the image obtainable by the product is relatively low and resolution is not the important feature of the product, the resolution pattern may be designed and selected to suit the relatively low resolution or omitted.

As described above, because it is unlikely that the completed state of the image processing apparatus will greatly deviate from the adjusted values by the time the image processing apparatus is set up, the image evaluation patterns used by the service people or the user need not be printed with an extremely high precision as in the case of the conventional text charts. For this reason, the product catalog C which includes the image evaluation patterns can be made without considerably increasing the cost of the product catalog C.

In addition, because the image evaluation patterns can be included in the relatively inexpensive product catalog C, it becomes possible for the service people and the user to carry the image evaluation patterns. In addition, the service people and the user need not handle the product catalog C with extreme care as required in the case of the conventional test charts.

Furthermore, the same image evaluation patterns used in one product catalog may be used in common with another product catalog, thereby enabling the reduction of the cost involved in designing and preparing the image evaluation patterns.

Each description region such as the descriptive portion 11 and the graphic region 12 may be provided exclusively for describing the product. In addition, at least a portion of the description region may be used in common for describing the product and as an image evaluation pattern. The latter case will be described later.

Figure 2A:
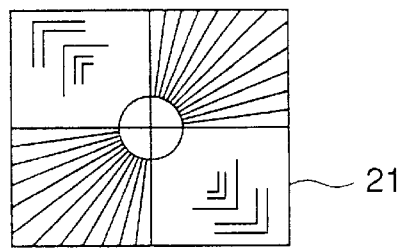
FIGS. 2A, 2B and 2C respectively are plan views showing embodiments of image evaluation patterns usable in the first embodiment.
Figure 2B:
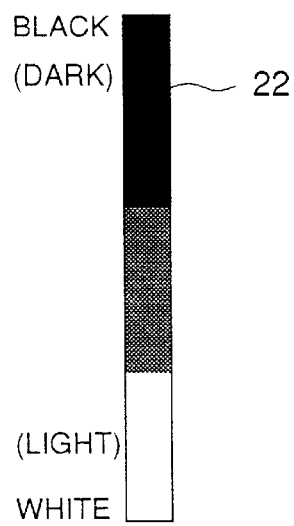
Figure 2C:
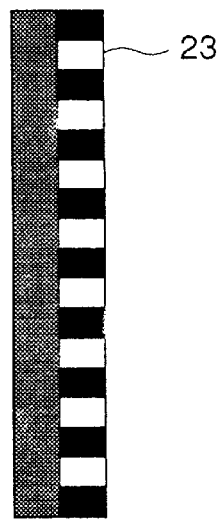

FIGS. 2A, 2B and 2C respectively show embodiments of the resolution pattern 21, the gradation scale 22 and the black-and-white pattern 23.

Next, a description will be given of a second embodiment of the product catalog according to the present invention, by referring to FIG. 3.

Figure 3:
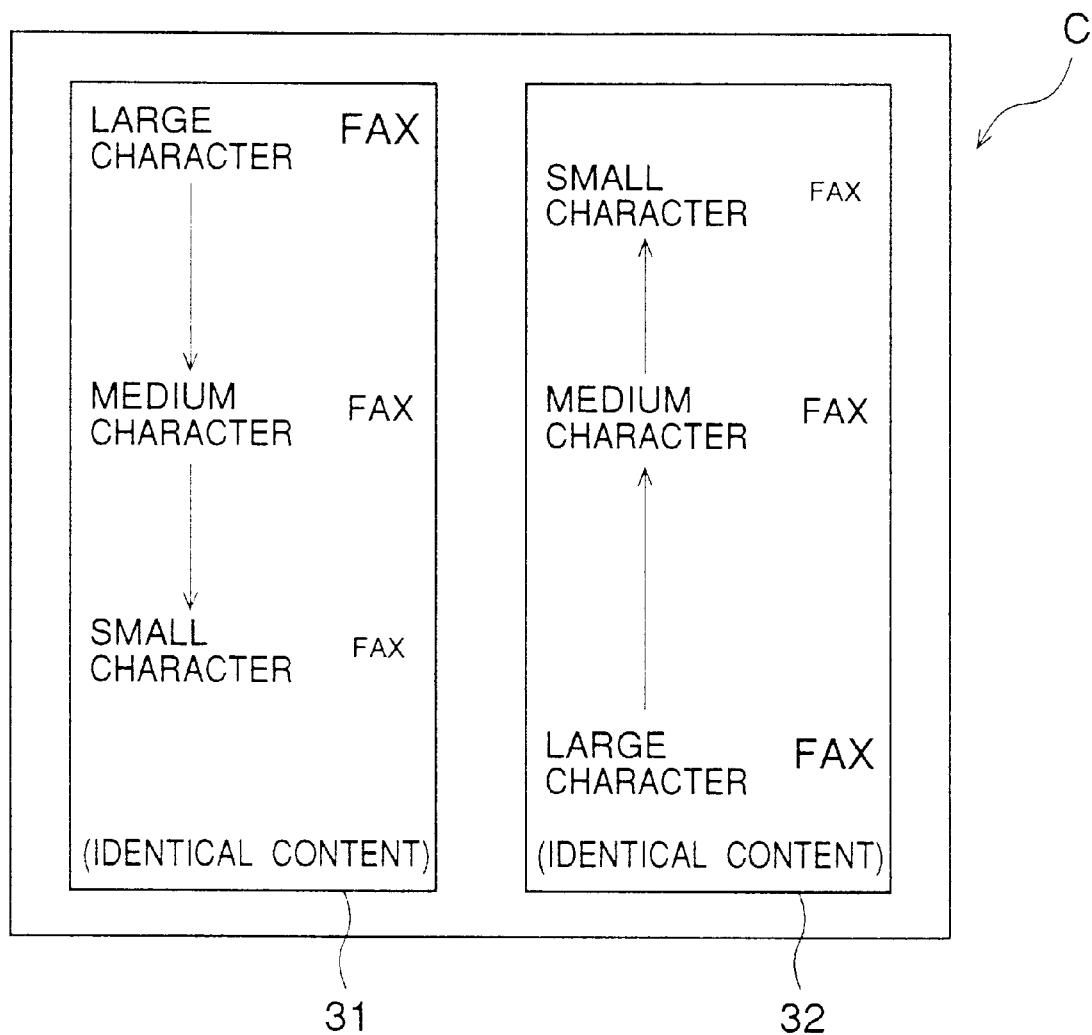
FIG. 3 is a plan view showing a second embodiment of the product catalog according to the present invention.

FIG. 3 shows only an important portion of this second embodiment. The product catelog C shown in FIG. 3 includes descriptive portions 31 and 32. The size of the characters in the descriptive portion 31 gradually decreases from top to bottom. On the other hand, the size of the characters in the descriptive portion 32 gradually increases from top to bottom. The content of the description within the descriptive portion 31 is identical to that within the descriptive portion 32.

Because the characters within the descriptive portions 31 and 32 have various sizes, it is possible to evaluate therefrom the resolution of the image obtained by the image processing apparatus by determining the minimum size of the recognizable characters. In addition, since identical descriptions are provided within the descriptive portions 31 and 32, the characters at the lower portion of the descriptive portion 31 which are too small to be recognized can be recognized from the corresponding lower portion of the descriptive portion 32 which contains the same but larger characters. Hence, the description within the descriptive portions 31 and 32 can be recognized regardless of the resolution by appropriately setting the average size of the character, so that the function of the product catalog C itself will not be lost.

Next, a description will be given of a third embodiment of the product catalog according to the present invention, by referring to FIG. 4.

Figure 4:
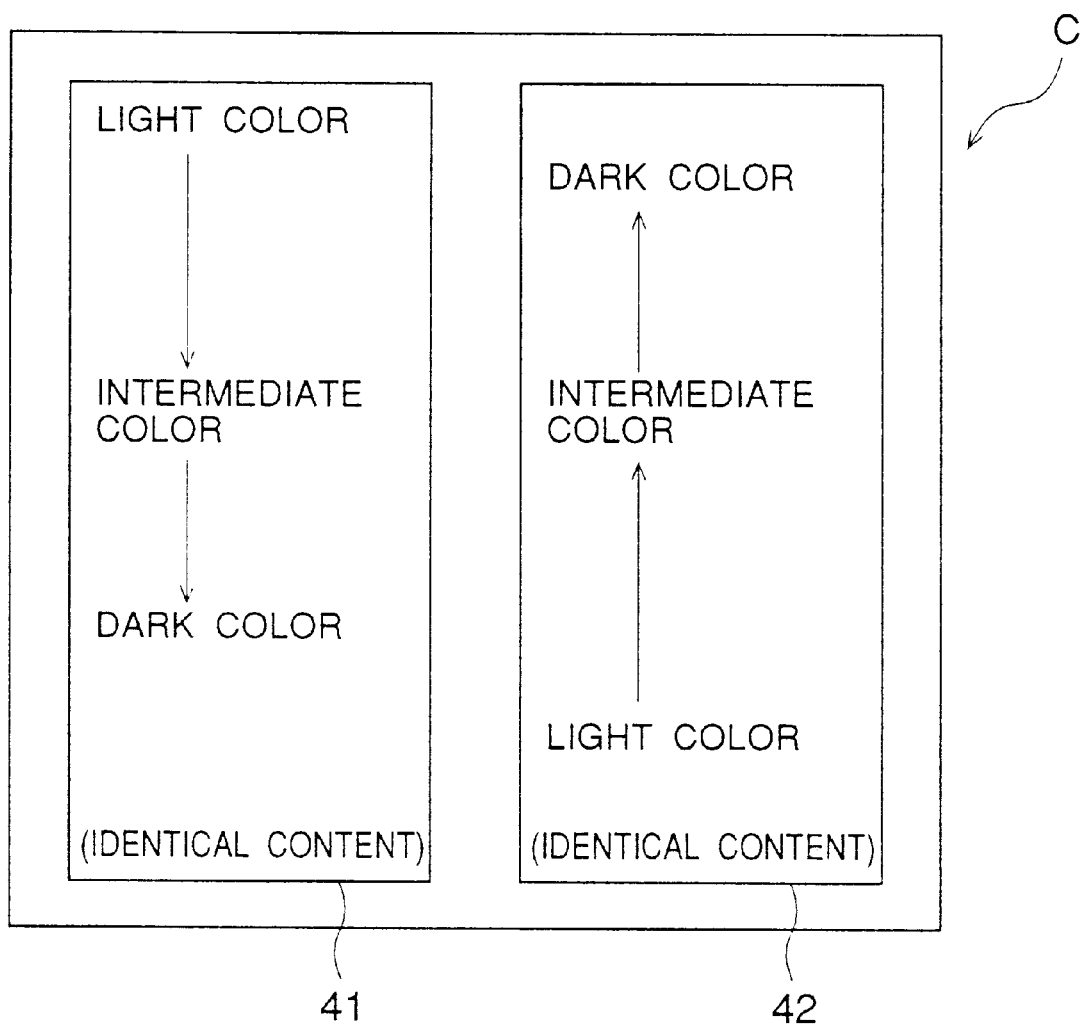
FIG. 4 is a plan view showing a third embodiment of the product catalog according to the present invention.

FIG. 4 shows only an important portion of this third embodiment. The product catalog C shown in FIG. 4 includes descriptive portions 41 and 42. The color of the characters in the descriptive portion 41 gradually darkens from top to bottom. On the other hand, the color of the characters in the descriptive portion 42 gradually lightens from top to bottom. The content of the description within the descriptive portion 41 is identical to that within the descriptive portion 42.

Because the characters within the descriptive portions 41 and 42 have various colors, it is possible to evaluate therefrom the color characteristic and the resolution of the image obtained by the image processing apparatus by determining the color of the recognizable characters. In addition, since identical descriptions are provided within the descriptive portions 41 and 42, the characters at the upper portion of the descriptive portion 41 which are too light to be recognized can be recognized from the corresponding upper portion of the descriptive portion 42 which contains the same but darker characters. Hence, the description within the descriptive portions 41 and 42 can be recognized regardless of the resolution by appropriately setting the average darkness or lightness of the color of the character, so that the function of the product catalog C itself will not be lost.

Next, a description will be given of a fourth embodiment of the product catalog according to the present invention, by referring to FIG. 5.

Figure 5:
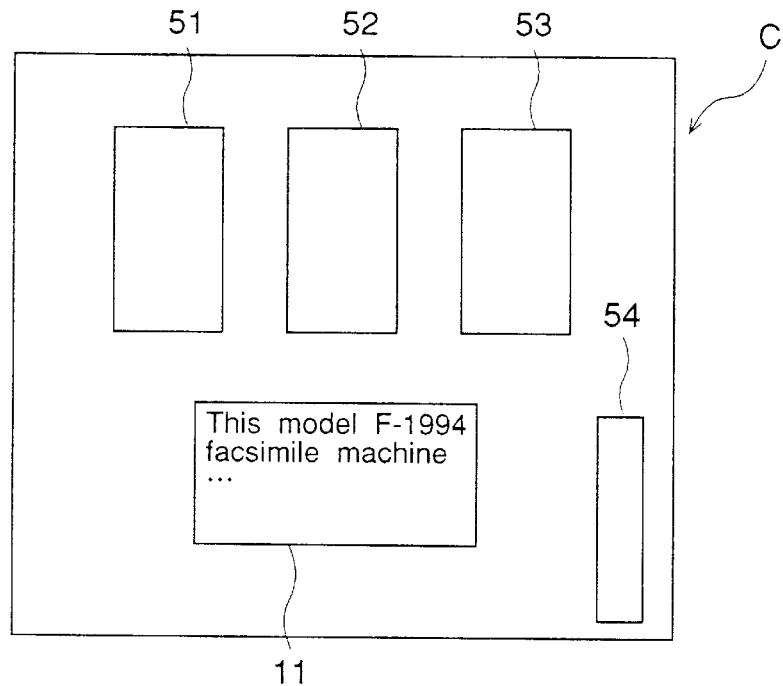
FIG. 5 is a plan view showing a fourth embodiment of the product catalog according to the present invention.

FIG. 5 shows only an important portion of this fourth embodiment. The product catalog C shown in FIG. 5 includes graphic portions 51, 52 and 53, and at least one image evaluation pattern 54. The gradation levels of the photographs in the graphic portions 51, 52 and 53 gradually increase from left to right, that is, from the graphic portion 51 towards the graphic portion 53. The image within the graphic portion 51 may be identical to those within the graphic portions 52 and 53 or, may be mutually different.

According to this embodiment, the gradation levels of the obtained image can be evaluated from the graphic portions 51, 52 and 53, and other performance factors can be evaluated from the image evaluation pattern 54.

Figure 6:
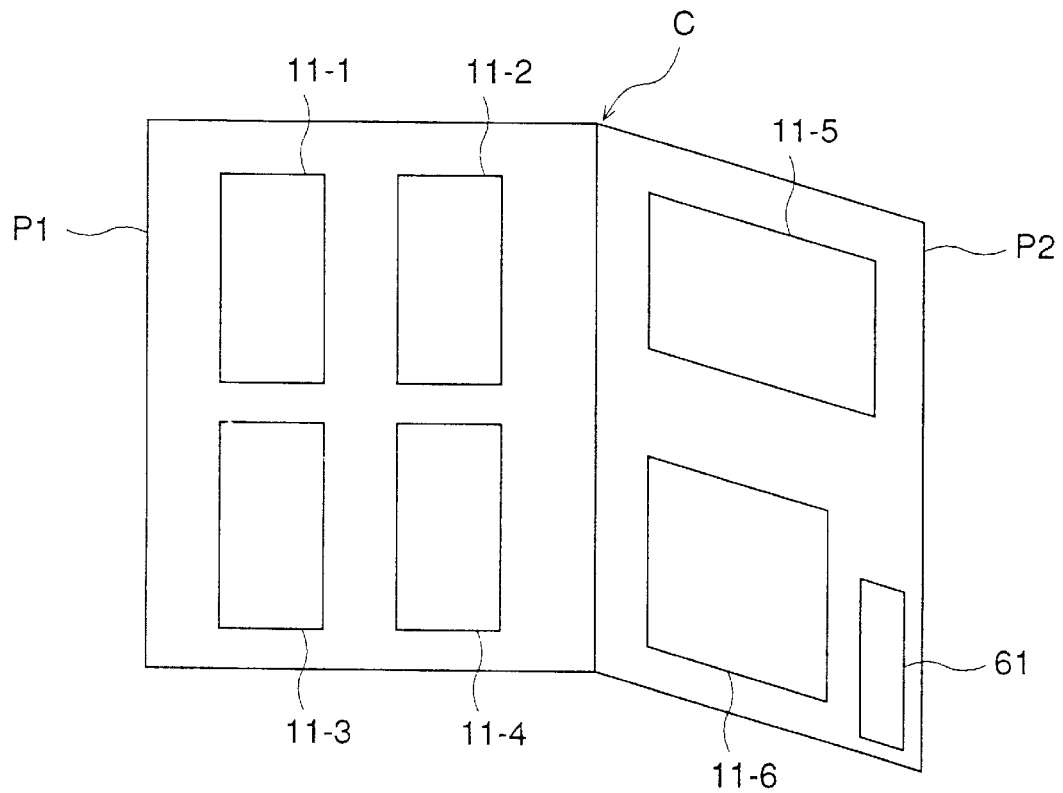
FIG. 6 is a perspective view showing a fifth embodiment of the product catalog according to the present invention.

Next, a description will be given of a fifth embodiment of the product catalog according to the present invention, by referring to FIG. 6.

In this fifth embodiment, the catalog C includes at least two pages P1 and P2. The pages P1 and P2 as a whole include at least one description region and at least one image evaluation region. In this particular case shown in FIG. 6, the page P1 includes descriptive/graphic portions 11-1 through 11-4, and the page P2 includes descriptive portions 11-5 and 11-6 and an image evaluation pattern 61.

According to this embodiment, at least one of the descriptive/graphic portions 11-1 through 11-6 is used in common as an image evaluation pattern for use in evaluating a characteristic of the image processing apparatus different from the characteristic to be evaluated using the image evaluation pattern 61.

In each of the embodiments described above, the product catalog itself may be mace of a sheet-shaped medium such as paper and resin. The material used for the product catalog may or may not be flexible. In addition, in order to prevent premature wear and to lengthen the life of the product catalog, it is possible to provide a coating on the surface of the product catalog.

Further, the present invention is not limited to these embodiments, but various variations and modifications may be made without departing from the scope of the present invention.

What is claimed is:

1. A product catalog to assist a user of an image reading apparatus, comprising:
   a recording medium having a first side and a second side;
   at least one description region, provided on an arbitrary one of the first and second sides of the recording medium, including characters and/or graphics describing operational features and/or characteristics of the image reading apparatus; and
   at least one image evaluation pattern, provided on an arbitrary one of the first and second sides of the same recording medium, including an image pattern which is read by said image reading apparatus for a user to evaluate a performance of said image reading apparatus.

2. The product catalog as claimed in claim 1, wherein said description region and said image evaluation pattern are provided on the same side of said recording medium.

3. The product catalog as claimed in claim 1, wherein said description region and said image evaluation pattern are provided on different sides of said recording medium.

4. The product catalog as claimed in claim 1, wherein the first and second sides of said recording medium are front and back sides of a single page.

5. The product catalog as claimed in claim 1, wherein the first and second sides of said recording medium are sides of mutually different pages.

6. The product catalog as claimed in claim 1, wherein said image evaluation pattern includes at least one of patterns for evaluating resolution, quality of oblique lines, gradation level, color sensation, contrast and sharpness.

7. The product catalog as claimed in claim 1, wherein said description region includes characters which form a predetermined image evaluation pattern which is selected from a group including said at least one image evaluation pattern and another image evaluation pattern different from said at least one image evaluation pattern.

8. The product catalog as claimed in claim 7, wherein said characters have sizes which gradually change along a predetermined direction.

9. The product catalog as claimed in claim 8, wherein the characters in one portion of the description region have sizes which gradually increase along the predetermined direction, and the characters in another portion of the description region display the same information but have sizes which gradually decrease along the predetermined direction.

10. The product catalog as claimed in claim 7, wherein said characters have colors which gradually change along a predetermined direction.

11. The product catalog as claimed in claim 10, wherein the characters in one portion of the description region have colors which gradually darken along the predetermined direction, and the characters in another portion of the description region display the same information but have colors which gradually lighten along the predetermined direction.

12. The product catalog as claimed in claim 1, wherein said description region includes graphics which form a predetermined image evaluation pattern which is selected from a group including said at least one image evaluation pattern and another image evaluation pattern different from said at least one image evaluation pattern.

13. The product catalog as claimed in claim 12, wherein said graphics have different gradation levels.

14. The product catalog as claimed in claim 12, wherein said graphics are selected from a group consisting of photographs and figures.

15. The product catalog as laimed in claim 1, wherein said image evaluation pattern is in conformance with a predetermined standard set for the kind of said image reading apparatus.

16. The product catalog as claimed in claim 1, wherein said description region and said image evaluation pattern are provided at mutually independent locations of said recording medium.

17. A product catalog to assist a user of an image reading apparatus, comprising:
   a recording medium having a first side and a second side;
   a plurality of description regions, provided on at least an arbitrary one of the first and second sides of the recording medium, said plurality of description regions including characters and/or graphics describing operational features and/or characteristics of the image reading apparatus; and
   an image evaluation pattern being formed by at least a portion of at least one of said plurality of description regions, said image evaluation pattern including an image pattern which is read by said image reading apparatus for a user to evaluate a performance of said image reading apparatus.

18. The product catalog as claimed in claim 17, wherein said description regions and said at least one description region including said image evaluation pattern are provided on the same side of said recording medium.

19. The product catalog as claimed in claim 17, wherein said description region and said at least one description region including said image evaluation pattern are provided on different sides of said recording medium.

20. The product catalog as claimed in claim 17, wherein the first and second sides of said recording medium are front and back sides of a single page.

21. The product catalog as claimed in claim 17, wherein the first and second sides of said recording medium are sides of mutually different pages.

22. The product catalog as claimed in claim 17, wherein said image evaluation pattern includes at least one of patterns for evaluating resolution, quality of oblique lines, gradation level, color sensation, contrast and sharpness.

23. The product catalog as claimed in claim 17, wherein said at least one description region including said image evaluation pattern has characters which form said image evaluation pattern.

24. The product catalog as claimed in claim 23, wherein said characters have sizes which gradually change along a predetermined direction.

25. The product catalog as claimed in claim 24, wherein the characters in one portion of said at least one description region have sizes which gradually increase along the predetermined direction, and the characters in another portion of said at least one description region display the same information but have sizes which gradually decrease along the predetermined direction.

26. The product catalog as claimed in claim 23, wherein said characters have colors which gradually change along a predetermined direction.

27. The product catalog as claimed in claim 26, wherein the characters in one portion of said at least one description region have colors which gradually darken along the predetermined direction, and the characters in another portion of said at least one description region display the same information but have colors which gradually lighten along the predetermined direction.

28. The product catalog as claimed in claim 17, wherein said at least one description region including said image evaluation pattern has graphics which form said image evaluation pattern.

29. The product catalog as claimed in claim 28, wherein said graphics have different gradation levels.

30. The product catalog as claimed in claim 28, wherein said graphics are selected from a group consisting of photographs and figures.

31. The product catalog as claimed in claim 17, wherein said image evaluation pattern is in conformance with a predetermined standard set for the kind of said image reading apparatus.

32. The product catalog as claimed in claim 17, which further comprises:
at least one independent image evaluation pattern provided on at least one of the first and second sides of said recording medium at locations avoiding said description regions.

33. A product catalog to assist a user of an image reading apparatus, comprising:
a recording medium having a first side and a second side;
at least one description region, provided on an arbitrary one of the first and second sides of the recording medium, including characters and/or graphics describing operational features and/or characteristics of a first image reading apparatus; and
at least one image evaluation pattern, provided on an arbitrary one of the first and second sides of the same recording medium, including an image pattern which is read by a second image reading apparatus for a user to evaluate a performance of said second image reading apparatus.

34. A product catalog method to assist a user of an image reading apparatus, comprising the steps of:
providing a recording medium having at least two sides and including a description region having data describing operational features and/on characteristics of an image reading apparatus and including an image evaluation pattern, said description region and said image evaluation pattern being provided on an arbitrary one of said two sides of said recording medium;
reading said image evaluation pattern on said recording medium by said image reading apparatus; and
evaluating a performance of said image reading apparatus based on said read image evaluation pattern.

35. A device for describing and testing image reading apparatuses, comprising:
a product catalog having a plurality of pages;
at least one description region, provided on one of the pages, including characters and/or graphics describing at least predetermined operational features of a group of image reading apparatuses; and
at least one image evaluation pattern, provided on one of the pages of the same product catalog, including an image pattern which is read by an actual image reading apparatus for a user to evaluate a performance of said actual image reading apparatus.

36. The device as claimed in claim 35, wherein said description region and said image evaluation pattern are provided on the same page.

37. The device as claimed in claim 35, wherein said description region and said image evaluation pattern are provided on different pages.

38. The device as claimed in claim 35, wherein the at least one description region and at least one image evaluation pattern are provided on front and back sides of a single page.

39. The device as claimed in claim 35, wherein the at least one description region and at least one image evaluation pattern are provided on sides of mutually different pages.

40. The device as claimed in claim 35, wherein said image evaluation pattern includes at least one of patterns for evaluating resolution, quality of oblique lines, gradation level, color sensation, contrast and sharpness.

41. The device as claimed in claim 35, wherein said description region includes characters which form a predetermined image evaluation pattern which is selected from a group including said at least one image evaluation pattern and another image evaluation pattern different from said at least one image evaluation pattern.

42. The device as claimed in claim 41, wherein said characters have sizes which gradually change along a predetermined direction.

43. The device as claimed in claim 42, wherein the characters in one portion of the description region have sizes which gradually increase along the predetermined direction, and the characters in another portion of the description region display the same information but have sizes which gradually decrease along the predetermined direction.

44. The device as claimed in claim 41, wherein said characters have colors which gradually change along a predetermined direction.

45. The device as claimed in claim 44, wherein the characters in one portion of the description region have colors which gradually darken along the predetermined direction, and the characters in another portion of the description region display the same information but have colors which gradually lighten along the predetermined direction.

46. The device as claimed in claim 35, wherein said description region includes graphics which form a predetermined image evaluation pattern which is selected from a group including said at least one image evaluation pattern and another image evaluation pattern different from said at least image evaluation pattern.

47. The device as claimed in claim 46, wherein said graphics have different gradation levels.

48. The device as claimed in claim 46, wherein said graphics are selected from a group consisting of photographs and figures.

49. The device as claimed in claim 35, wherein said image evaluation pattern is in conformance with a predetermined standard set for image reading apparatuses.

50. The device as claimed in claim 35, wherein said description region and said image evaluation pattern are provided at mutually independent locations of said product catalog.

51. A device for describing and testing image reading apparatuses, comprising:
a product catalog having a plurality of pages;

a plurality of description regions, provided on one of the pages, said plurality of description regions including characters and/or graphics describing predetermined operational features of a group of image reading apparatuses; and an image evaluation pattern being formed by at least a portion of at least one of said plurality of description regions, said image evaluation pattern including an image pattern which is read by an actual image reading apparatus for a user to evaluate an actual performance of said actual image reading apparatus.

52. The device as claimed in claim 51, wherein said description regions and said at least one description region including said image evaluation pattern are provided on the same page.

53. The device as claimed in claim 51, wherein said description region and said at least one description region including said image evaluation pattern are provided on different pages.

54. The device as claimed in claim 51, wherein the plurality of description regions and the image evaluation pattern are provided on front and back sides of a single page.

55. The device as claimed in claim 51, wherein the plurality of description regions and the image evaluation pattern are provided on front and back sides of a single page.

56. The device as claimed in claim 51, wherein said image evaluation pattern includes at least one of patterns for evaluating resolution, quality of oblique lines, gradation level, color sensation, contrast and sharpness.

57. The device as claimed in claim 51, wherein said at least one description region including said image evaluation pattern has characters which form said evaluation pattern.

58. The device as claimed in claim 57, wherein said characters have sizes which gradually change along a predetermined direction.

59. The device as claimed in claim 58, wherein the characters in one portion of said at least one description region have sizes which gradually increase along the predetermined direction, and the characters in another portion of said at least one description region display the same information but have sizes which gradually decrease along the predetermined direction.

60. The device as claimed in claim 57, wherein said characters have colors which gradually change along a predetermined direction.

61. The device as claimed in claim 60, wherein the characters in one portion of said at least one description region have colors which gradually darken along the predetermined direction, and the characters in another portion of said at least one description region display the same information but have colors which gradually lighten along the predetermined direction.

62. The device as claimed in claim 51, wherein said at least one description region including said image evaluation pattern has graphics which form said image evaluation pattern.

63. The device as claimed in claim 62, wherein said graphics have different gradation levels.

64. The device as claimed in claim 62, wherein said graphics are selected from a group consisting of photographs and figures.

65. The device as claimed in claim 51, wherein said image evaluation pattern is in conformance with a predetermined standard set for the kind of said image reading apparatus.

66. The device as claimed in claim 51, which further comprises:

a second independent image evaluation pattern provided on at least one of the pages not provided with said plurality of description regions.

67. A device for describing and testing image reading apparatuses, comprising:

a product catalog having a plurality of pages, each with a first side and a second side;

at least one description region, provided on one of the first, and second sides, including characters and/or graphics describing the predetermined operational features of a first one of the image reading apparatuses; and at least one image evaluation pattern, provided on one of the first and second sides, and which is read by an actual second one of the image reading apparatuses for a user to evaluate a performance of said actual second one of the image reading apparatuses.

68. A method for describing and testing image reading apparatuses, comprising the steps of:

providing a product catalog having at least two sides and including a description region having data describing predetermined operational features of a group of the image reading apparatuses, and including an image evaluation pattern, said description region and said image evaluation pattern being provided on an arbitrary one of said two sides of said product catalog;

reading said image evaluation pattern using an actual image reading apparatus; and evaluating a performance of said actual image reading apparatus based on said read image evaluation pattern.

* * * * *